United States Patent
Otani et al.

(10) Patent No.: US 7,864,000 B2
(45) Date of Patent: Jan. 4, 2011

(54) HIGH FREQUENCY SWITCHING CIRCUIT

(75) Inventors: Norihisa Otani, Yokohama (JP);
Eiichiro Otobe, Yokohama (JP)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 231 days.

(21) Appl. No.: 12/271,479

(22) Filed: Nov. 14, 2008

(65) Prior Publication Data

US 2009/0160264 A1    Jun. 25, 2009

(30) Foreign Application Priority Data

Dec. 25, 2007   (JP) .............................. 2007-332353

(51) Int. Cl.
*H01P 1/10*    (2006.01)
*H03H 7/19*    (2006.01)

(52) U.S. Cl. ...................................... 333/104; 333/139

(58) Field of Classification Search ................. 333/101, 333/103, 104, 105, 262, 139, 164, 81 R, 81 A
See application file for complete search history.

(56) References Cited

U.S. PATENT DOCUMENTS

| | | | | |
|---|---|---|---|---|
| 4,787,686 A | * | 11/1988 | Tajima et al. | 327/308 |
| 4,837,530 A | * | 6/1989 | Kondoh | 333/81 A |
| 4,978,932 A | * | 12/1990 | Gupta et al. | 333/81 R |
| 5,159,297 A | * | 10/1992 | Tateno | 333/104 |
| 5,250,910 A | | 10/1993 | Yabuki et al. | |
| 5,309,048 A | * | 5/1994 | Khabbaz | 327/310 |
| 7,675,382 B2 | * | 3/2010 | Deng et al. | 333/103 |

FOREIGN PATENT DOCUMENTS

| JP | 2004104394 | 4/2004 |
|---|---|---|
| JP | 2005-057375 A | 3/2005 |

OTHER PUBLICATIONS

Office Action for Korean Patent Application No. 10-2008-0054323 issued on May 14, 2010.

* cited by examiner

*Primary Examiner*—Dean O Takaoka
(74) *Attorney, Agent, or Firm*—Lowe Hauptman Ham & Berner LLP

(57) ABSTRACT

There is provided a high frequency switching circuit that can reduce generation of a harmonic signal without using a boost circuit. A high frequency switching circuit according to an aspect of the invention may include: a first switch having one end connected to a first port and the other end connected to a ground; a second switch having one end connected to a second port and the other end connected to the first port by a phase rotation element; and a control circuit controlling to turn off the first switch and turn on the second switch when a high frequency signal input to the first port is output through the second port, wherein the control circuit controls the off-state of the first switch so as to increase harmonics of the high frequency signal generated from the first switch, and the phase rotation element rotates the phase of the harmonics generated in the first switch within a frequency band of the harmonics, and cancels the phase-rotated harmonics generated from the first switch and harmonics generated from the second switch in opposite phases to each other.

7 Claims, 4 Drawing Sheets

HIGH FREQUENCY SWITCHING CIRCUIT

CROSS-REFERENCE TO RELATED APPLICATIONS

This application claims the priority of Japanese Patent Application No. 2007-332353 filed on Dec. 25, 2007, in the Japan patent Office, the disclosure of which is incorporated herein by reference.

BACKGROUND OF THE INVENTION

1. Field of the Invention

The present invention relates to a high frequency switching circuit used for switching frequency bands and switching between transmission and reception signals in a radio communication apparatus, such as a cellular phone.

2. Description of the Related Art

High frequency switching circuits using high frequency switches composed of FETs for switching between transmission and reception or converting modes of wireless devices are widely used in battery-operated radio communication apparatuses, such as cellular phones.

In a high frequency switching circuit using FETs as high frequency switches, when a large-power transmission signal passes through the switching circuit, distortion occurs in the transmission signal, and the non-linear characteristic of the FET causes distortion of the transmission high-frequency signal which then causes harmonics.

FIG. 5 is a view illustrating a configuration of a high-frequency switching circuit according to the related art.

A high frequency switch 50 is connected between a transmission terminal 10 and an antenna terminal 30. A high frequency switch 60 is connected between a transmission terminal 20 and the antenna terminal 30.

Further, a high frequency switch 40 and a high frequency switch 70 may also be provided. The first frequency switch 40 has one terminal connected to the transmission terminal 10 and the other end connected to a ground. The high frequency switch 70 may have one end connected to the transmission terminal 20 and the other end connected to a ground.

An on/off control of each of the high frequency switches 40, 50, 60, and 70 is performed by using a voltage applied from a control circuit (not shown) that is provided at a switch control terminal thereof.

That is, when zero voltage is applied to each control terminal, the high frequency switch is turned off. When a voltage of approximately 2.5 to 4.2 V is applied thereto, the high frequency switch is turned on.

During the transmission, it is controlled so that the high frequency switch 50 and the high frequency switch 70 are turned on, and the high frequency switches 40 and 60 are turned off.

Here, in order to reduce distortion when the high-frequency switch generates a high output, a method of using a boost circuit 80, shown in FIG. 5, is known.

Here, a voltage of approximately 2.5 to 4.2 V of a control signal is boosted to a voltage of approximately 7 to 9 by using the boost circuit 80. The boosted voltage is applied to the control terminals of the high frequency switch 50 and the high frequency switch 70. A potential difference between gate•drain/source of each of the high frequency switches 40 and 60 in an off-state is set to be higher than a control signal voltage of approximately 2.5 to 4.2 V, thereby reducing the distortion of the high frequency switches 40 and 60 in the off-state.

FIG. 6 is a view illustrating a basic configuration of the high frequency switching circuit according to the related art. In FIG. 6, a single-pole, single-throw (SPST) switch is used as a high frequency switch.

That is, in the related art, the high frequency switching circuit including SPST switches suppresses distortion of the high frequency signal generated from the high frequency switch 40 in the off-state, that is, the high frequency switching circuit reduces distortion of the high frequency signal, such that when a high frequency signal A input from the transmission terminal 10 reaches the antenna terminal 30, a high frequency signal F that slightly produces small second and third harmonics $2F_0$ and $3F_0$ is obtained.

FIG. 7 is a view illustrating harmonic generation in the high frequency switching circuit according to the related art.

When the high frequency signal A that is applied to the transmission terminal 10 is transmitted to the antenna terminal 30, the harmonics generated due to the distortion caused by the high frequency switch 40 in the off-state can be reduced from a state $E_1$ to a state $E_2$ by boosting an output voltage of the boost circuit to a voltage of approximately 7 to 9 V.

Meanwhile, harmonics are generated by the high frequency signal A that is transmitted by the high frequency switch 50 in the on-state, which is shown as a state C in FIG. 7.

A harmonic E2 generated by the high frequency switch 40 in the off-state and a harmonic C generated by the high frequency switch 50 in the on-state are added to output a high frequency signal containing harmonics indicated by a sate F through the antenna terminal 30.

Even though the harmonics generated by the high frequency switch 40 in the off-state are reduced by using the method of reducing distortion according to the related art, a large distortion is caused by the high frequency switch 50 in the on-state, and harmonics generated by the distortion are added. As a result, the distortion is not significantly reduced.

As a method of reducing harmonics generated due to distortion caused by high frequency switches, a method disclosed in Japanese Patent Laid-Open Publication No. 2005-057375 is known.

The invention disclosed in Japanese Patent Laid-Open Publication No. 2005-057375, inserts phase adjusting lines and low-pass filters between the antenna terminal and the transmission terminal, and adjusts a phase difference between a progressive wave and a reflected wave such that the power of a composite wave made up of the progressive wave generated from the high frequency switch and the reflected wave resulting from reflection of the progressive wave from each of the LPFs.

Various kinds of methods of suppressing harmonic generation due to distortion caused by the high frequency switch have been proposed. However, the method of using the boost circuit increases power consumption of the boost circuit when a boost voltage is high.

Even when the boost circuit is provided, it may not result in a reduction in harmonics. Further, the method, disclosed in Japanese Patent Laid-Open Publication No. 2005-057375, requires devices, such as low-pass filters or phase adjusting lines. Therefore, it is difficult to reduce manufacturing costs or size of terminals, such as, cellular phones.

SUMMARY OF THE INVENTION

An aspect of the present invention provides a high frequency switching circuit that can reduce harmonics by adding a simplified circuit device without using a boost circuit.

According to an aspect of the present invention, there is provided a high frequency switching circuit including: a first switch having one end connected to a first port and the other end connected to a ground; a second switch having one end connected to a second port and the other end connected to the first port by a phase rotation element; and a control circuit controlling to turn off the first switch and turn on the second switch when a high frequency signal input to the first port is output through the second port, wherein the control circuit controls the off-state of the first switch so as to increase harmonics of the high frequency signal generated from the first switch, and the phase rotation element rotates the phase of the harmonics caused generated in the first switch within a frequency band of the harmonics, and cancels the phase-rotated harmonics generated from the first switch and harmonics generated from the second switch in opposite phases to each other.

The harmonics generated by the first switch are phase-rotated, and the harmonics caused by the second switch and the phase-rotated harmonics are cancelled in opposite phases to each other. The phase rotation may be within an angle of 180°.

Therefore, the remaining harmonics may be significantly reduced.

The first switch and the second switch may include field effect transistors, and the off-state of the first switch may be controlled to increase distortion of the high frequency signal by reducing a potential difference between gate•drain/source of the field effect transistor.

Therefore, a boost circuit, used in the related art, is not required, thereby simplifying a circuit configuration.

The phase rotation element may be a transmission line provided on a substrate.

The transmission line may be a micro strip line or a strip line.

The phase rotation element may be an inductor.

Therefore, the phase rotation element may be provided on the substrate with the simplified circuit configuration.

The control circuit may supply a control voltage to the first switch and the second switch so that the amount of distortion of the high frequency signal by the first switch is the same as that of the high frequency signal by the second switch.

Since the amount of the distortion of the high frequency signal is the same as that of the high frequency signal by the first switch, the produced harmonics in opposite phases are cancelled.

Therefore, the remaining harmonics may be significantly reduced.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
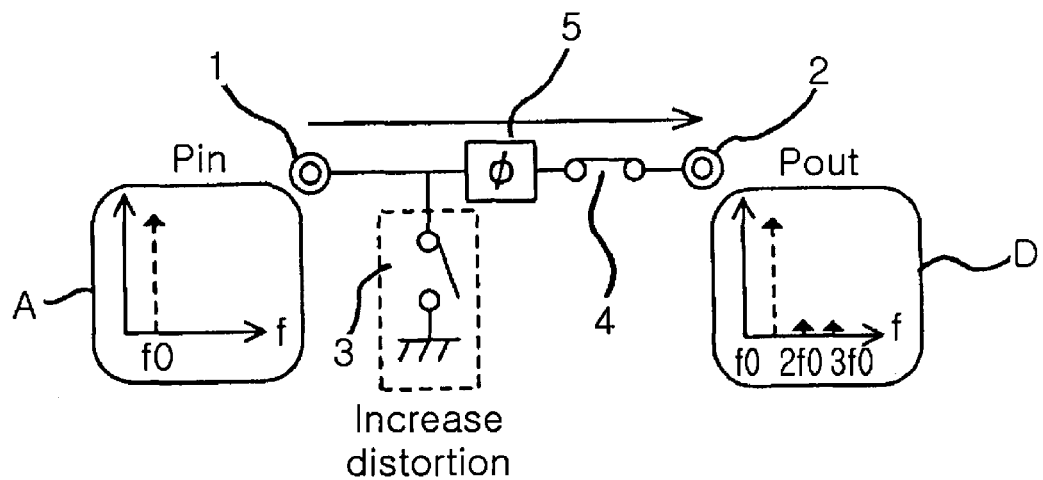
FIG. 1 is a view illustrating a basic configuration of a high frequency switching circuit according to an exemplary embodiment of the invention.

Exemplary embodiments of the present invention will now be described in detail with reference to the accompanying drawings.

Like reference numerals in the drawings denote like elements, and a detailed description thereof will be omitted.

FIG. 1 is a view illustrating a basic configuration of a high frequency switching circuit according to an exemplary embodiment of the invention.

As shown in FIG. 1, the high frequency switching circuit according to this embodiment includes a high frequency switch 3 and a high frequency switch 4. The high frequency switch 3 includes one end connected to a transmission terminal 1 and the other end connected to a ground. The high frequency switch 4 has one end connected to an antenna terminal 2 and the other end connected to the transmission terminal 1 by a phase rotation element 5. Further, a control circuit (not shown) for controlling the high frequency switches 3 and 4 is included.

When a high frequency signal that is input to the transmission terminal 1 is output through the antenna terminal 2, it is controlled so that the high frequency switch 3 is turned off and the high frequency switch 4 is turned on.

Here, the control circuit controls the off-state of the high frequency switch 3 in order to increase harmonics of the high frequency signal that are generated by the high frequency switch 3.

That is, a potential difference between gate•drain/source of an FET forming the high frequency switch 3 is reduced, and distortion caused by the FET switch is increased. That is, the harmonics are increased by increasing the distortion.

As such, since the distortion can be increased by reducing a control voltage that is supplied to the switch, the boost circuit is not required unlike the related art.

Figure 2:
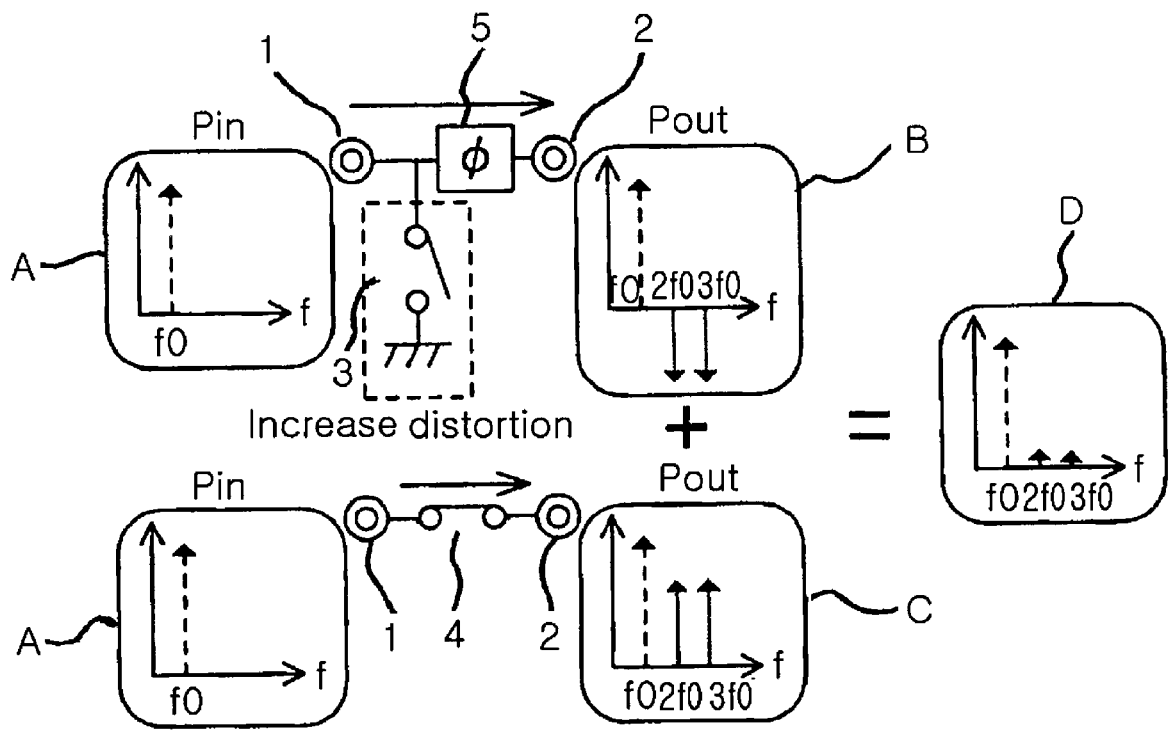
FIG. 2 is a view illustrating the principle of reducing harmonics in the high frequency switching circuit according to the embodiment of the invention.

FIG. 2 is a view illustrating the principle of reducing harmonics in the high frequency switching circuit according to the embodiment of the invention.

That is, as shown in FIGS. 1 and 2, when a high frequency signal in a state D is input from the transmission terminal 1, a signal in a state B can be obtained through the antenna terminal 2.

That is, a second harmonic wave $2F_0$ and a third harmonic wave $3F_0$ are rarely found in the signal in the state D.

As shown in FIG. 2, when a high frequency signal in a state A is input from the transmission terminal 1, harmonics are increased due to a large distortion caused by the high frequency switch 3.

The high frequency signal having the increased harmonics passes through the phase rotation element, and is inverted. Then, the inverted signal in a state B is output through the antenna terminal 2.

The high frequency signal passing through the high frequency switch 4 in the on-state contains harmonics in the state C, and is output through the antenna terminal 2.

Here, the harmonic component in the state B and the harmonics in the state C have almost the same magnitude and phases opposite to each other. As a result, in the antenna terminal 2, the signal in the state B and the signal in the state C are added to each other to cancel harmonics and output a signal in the state D.

Further, in order to cancel the harmonics having phases opposite to each other, the phase rotation element 5 needs to be designed so that the harmonics caused by the high frequency switch 3 are phase-rotated within an angle of 180° at frequency bands of the harmonics.

To this end, the high frequency switches 3 and 4 are composed of field effect transistors, and the control of the off-state of the high frequency switch 3 is performed by reducing the potential difference between the gate•drain/source of each of the field effect transistors so as to increase the distortion of the high frequency signal.

Further, the phase rotation element used in the embodiment of the invention may include a transmission line formed on the substrate. The transmission line may be implemented by providing a micro strip line or a strip line on a low temperature cofired ceramics (LTCC) substrate.

Further, the phase rotation element may be composed of an inductor.

As described above, since a high frequency switching circuit with low voltage and high linearity can be realized without using the boost circuit, used in the related art, power consumption can be reduced.

Further, even when a phase change occurs in the input high-frequency signal, this can be adjusted by the phase rotation element 5, and thus insertion loss is not affected. For the convenience of explanation, in the circuit, shown in FIGS. 1 and 2, the SPST (Single Pole, Single Throw) switch is shown. However, when the high frequency switch is composed of a multi-port high frequency switch, which is a Multi Pole, Multi Throw (MPMT) switch, such as an SPDT (Single Pole, Double Throw) switch, an SP3T switch, or a DPDT (Double Pole, Double Throw) switch, the high frequency switching circuit according to this embodiment can be implemented.

Figure 3A:
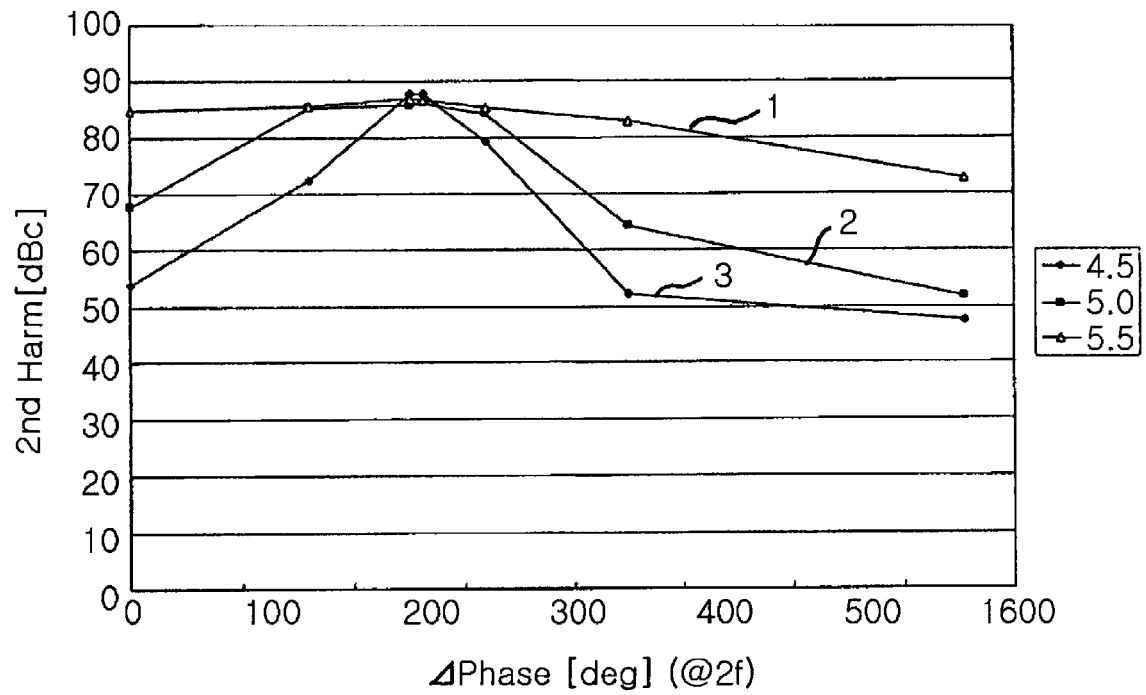
FIG. 3A is a view illustrating the relationship between the amount of phase rotation and harmonics of an SPST switch.
Figure 3B:
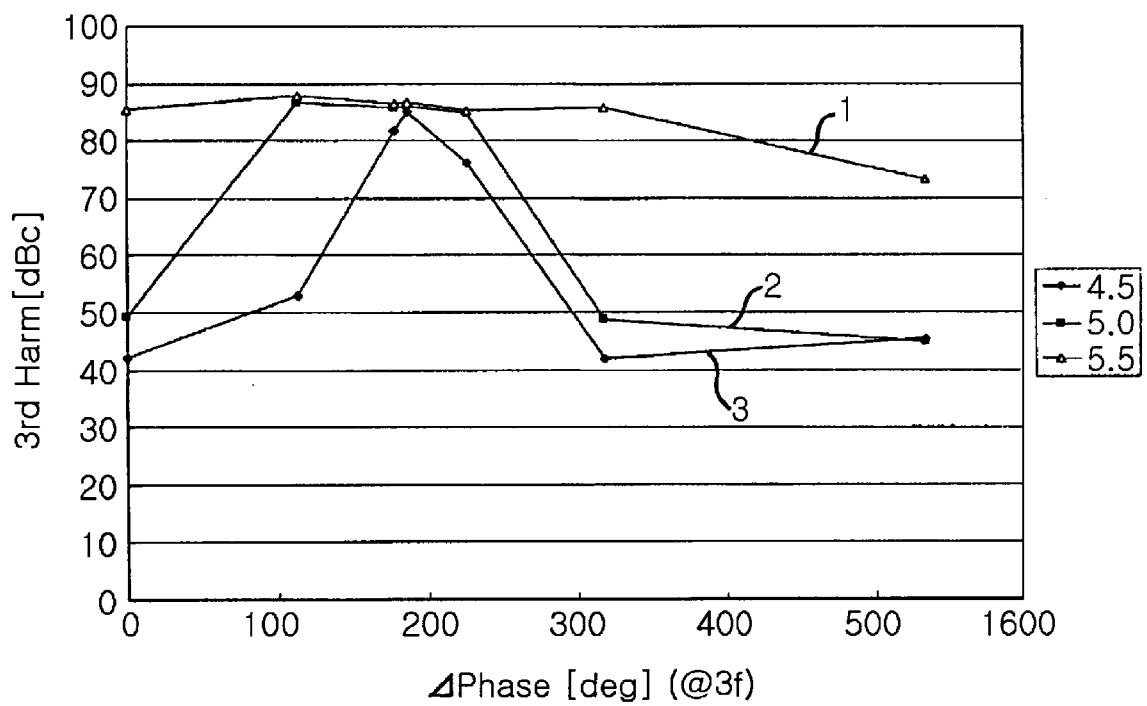
FIG. 3B is a view illustrating the relationship between the amount of phase rotation and harmonics of an SPST switch.

FIGS. 3A and 3B are views illustrating the relationship between a phase variation and harmonics when a frequency $F_0$ of the high frequency signal, which is input to the transmission terminal 2, is 1.9 GHz.

In FIG. 3A, the relationship between the second harmonic and the phase variation is shown. In FIG. 3B, the relationship between the third harmonic and the phase variation is shown.

In a case of a characteristic curve (1), a control voltage of 5.5 V is applied to a switch. In a case of a characteristic curve (2), a control voltage is 5.0 V. In a case of a characteristic curve (3), a control voltage is 4.5 V.

As shown in FIGS. 3A and 3B, the smaller the control voltage is, the larger the distortion is. However, in a case of a specific phase, for example, a second harmonic, a peak of a signal level of the harmonic is determined around 130°.

Further, in a case of the third harmonic, a peak is determined around 180°.

Figure 4:
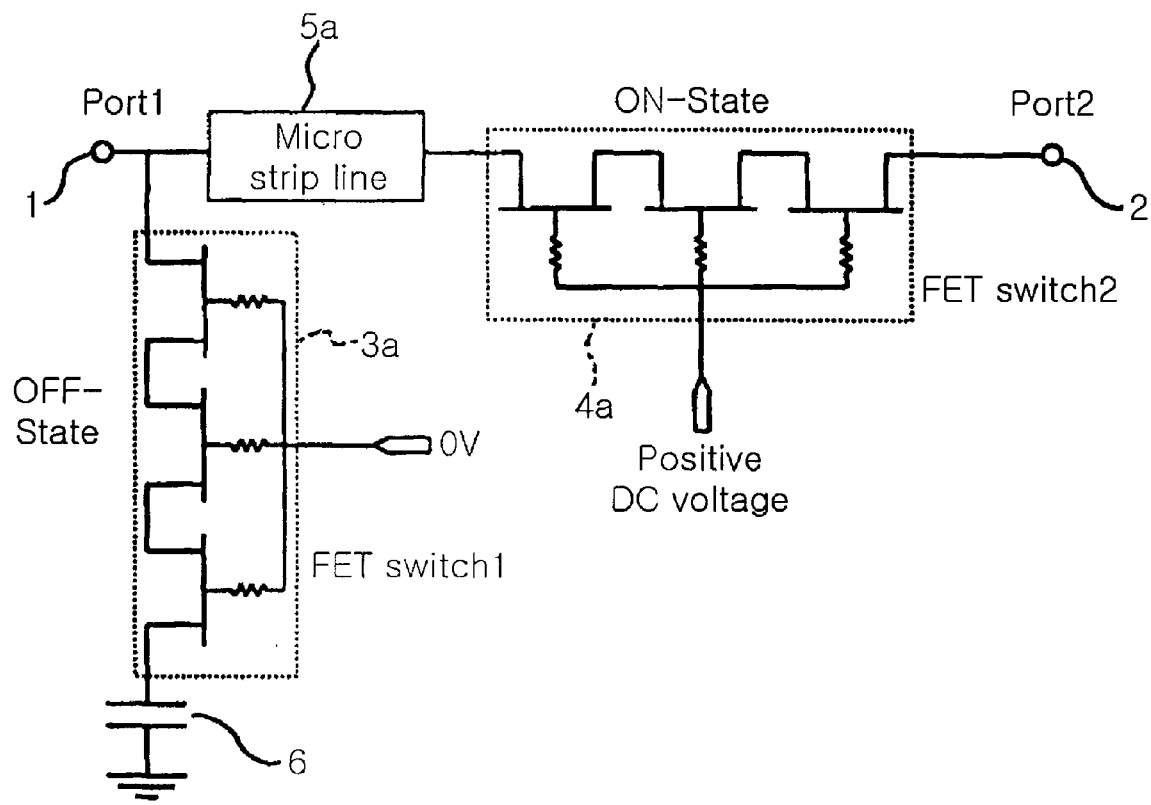
FIG. 4 is a view illustrating a configuration of a high frequency switching circuit according to an exemplary embodiment of the invention.

FIG. 4 is a view illustrating a high frequency switching circuit according to another exemplary embodiment of the invention.

An FET switch 3a is connected in series between a transmission terminal 1 and a ground through a short-circuit capacitor 6.

Further, a switch 4a is connected between the transmission terminal 1 and the antenna terminal 2 through a micro strip line 5a.

Figure 5:
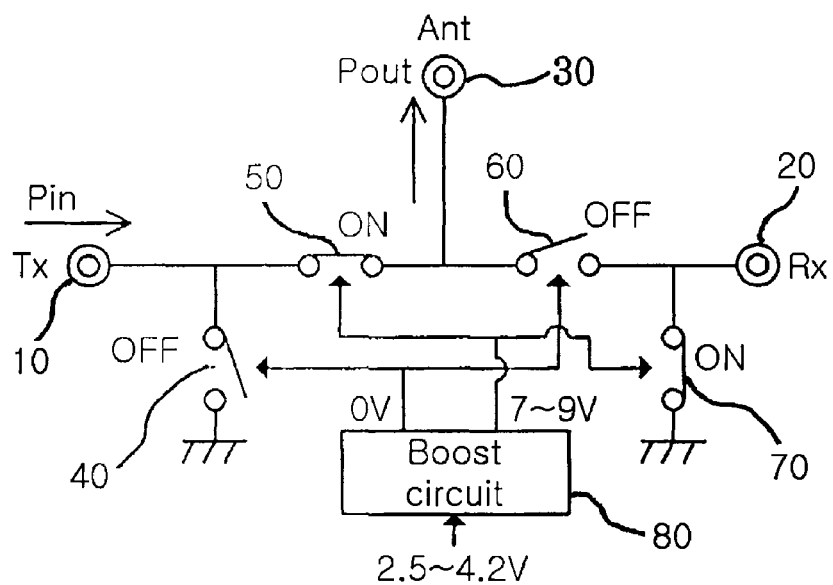
FIG. 5 is a view illustrating a configuration of a high frequency switching circuit according to the related art.
Figure 6:
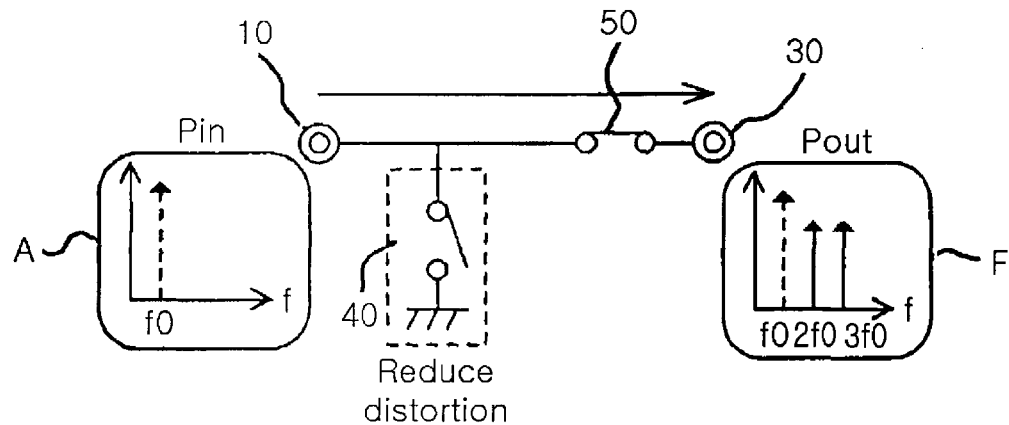
FIG. 6 is a basic configuration view illustrating the high frequency switching circuit according to the related art.
Figure 7:
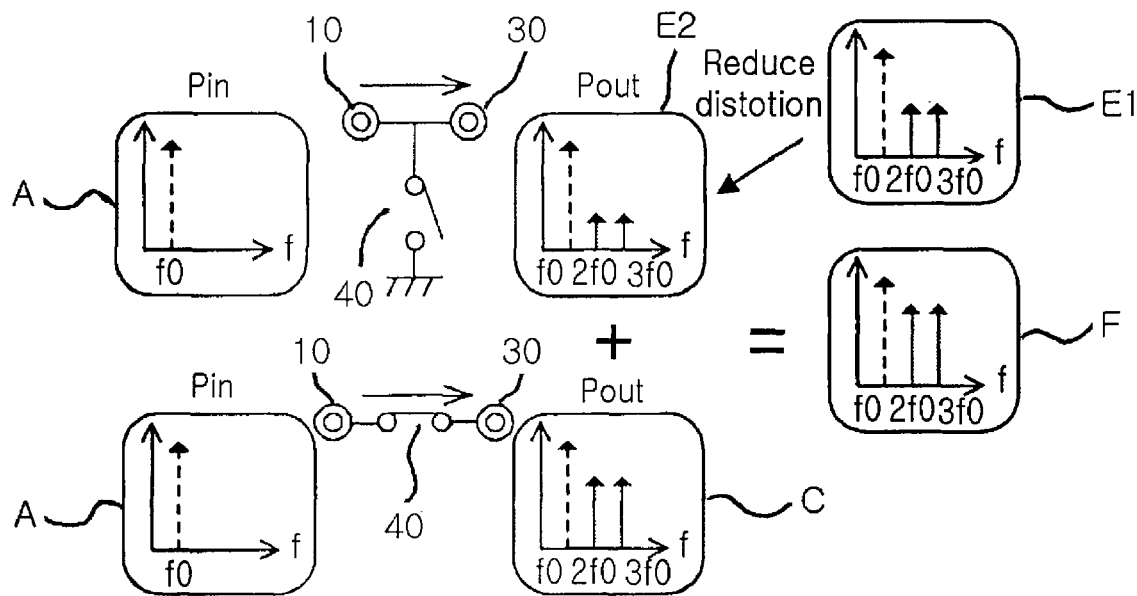
FIG. 7 is a view illustrating harmonic generation in the high frequency switching circuit according to the related art.

In order that a transmission terminal (port 1) and an antenna terminal 2 (port 2) are connected to each other, a control voltage applied to a gate of the FET switch 3a is set to zero voltage, and a control voltage applied to a gate of the FET switch 4a is set to a constant voltage. Then, the FET switch 3a is turned off, the FET switch 4a is turned on, and the port 1 and the port 2 are connected to each other. An output voltage of a battery used in a cellular phone that is smaller than that of the circuit according to the related art, shown in FIG. 5, is enough for the constant voltage, which is the control voltage.

Here, distortion caused by the FET switch 3a and the FET switch 4 due to the constant voltage will be described.

When the positive control voltage is set to a high voltage of approximately 7 V, the FET switch 4a is turned on, and a voltage Vgs2 between the gate and the drain becomes 0.6 V due to diode characteristics, a voltage between the gate and the drain becomes approximately 0.6 V. A drain/source potential correspondingly becomes 6.4 V.

Since the drain/source potential of the FET switch 3a is 6.4 V like the FET switch 4a, a voltage Vgs1 between the gate•drain/source of the FET 3a becomes −6.4 V, and is turned off.

When the constant voltage is reduced to approximately 4.5 V, a voltage Vgs2 between the gate•drain/source of the FET switch 4a becomes 0.6 V, and a voltage difference Vgs1 between the gate•drain/source of the FET switch 3a becomes −3.9 V.

When the constant value is reduced, the voltage between the gate•drain/source of the FET switch 4a is only changed.

In general, when FET switch is turned off, the larger the absolute value of the voltage difference between the gate•drain/source is, the less distortion is generated.

Further, in a case of the high voltage of approximately 7 V, the distortion of the FET switch 3a in the off-state is smaller than that of the FET switch 4a in the on-state.

In this case, the effect of the cancellation of the harmonics in opposite phases to each other by using the micro strip line 5a is small.

When the constant value has a low value, the distortion of the FET switch 3a is only increased, and there is a constant voltage that is distorted by the same amount of distortion generated by the FET switch 4a.

Here, the effect of the cancellation of the harmonics in opposite phases by using the micro strip line 5a is increased.

Further, even when a phase change occurs in the input high frequency signal, insertion loss is not affected since it can be controlled by the micro strip line 5a.

As set forth above, according to exemplary embodiments of the invention, harmonics can be reduced by adding a simplified circuit device without using a boost circuit.

While the present invention has been shown and described in connection with the exemplary embodiments, it will be apparent to those skilled in the art that modifications and variations can be made without departing from the spirit and scope of the invention as defined by the appended claims.

What is claimed is:

1. A high frequency switching circuit comprising:
    a first switch having one end connected to a first port and the other end connected to a ground;
    a second switch having one end connected to a second port and the other end connected to the first port by a phase rotation element; and
    a control circuit controlling to turn off the first switch and turn on the second switch when a high frequency signal input to the first port is output through the second port,
    wherein the control circuit controls the off-state of the first switch so as to increase harmonics of the high frequency signal generated from the first switch, and the phase rotation element rotates the phase of the harmonics generated in the first switch within a frequency band of the harmonics, and cancels the phase-rotated harmonics generated from the first switch and harmonics generated from the second switch in opposite phases to each other.

2. The high frequency switching circuit of claim 1, wherein the phase rotation is within an angle of 180°.

3. The high frequency switching circuit of claim 1, wherein the first switch and the second switch comprise field effect transistors, and the off-state of the first switch is controlled to increase distortion of the high frequency signal by reducing a potential difference between gate drain/source of the field effect transistor.

4. The high frequency switching circuit of claim 1, wherein the phase rotation element is a transmission line provided on a substrate.

5. The high frequency switching circuit of claim 4, wherein the transmission line is a micro strip line or a strip line.

6. The high frequency switching circuit of claim 1, wherein the phase rotation element is an inductor.

7. The high frequency switching circuit of claim 3, wherein the control circuit supplies a control voltage to the first switch and the second switch so that the amount of distortion of the high frequency signal by the first switch is the same as that of the high frequency signal by the second switch.

* * * * *